United States Patent [19]

Locke

[11] Patent Number: 4,675,813
[45] Date of Patent: Jun. 23, 1987

[54] PROGRAM ASSIGNABLE I/O ADDRESSES FOR A COMPUTER

[75] Inventor: James S. Locke, Palo Alto, Calif.

[73] Assignee: Northern Telecom Limited, Montreal, Canada

[21] Appl. No.: 688,548

[22] Filed: Jan. 3, 1985

[51] Int. Cl.⁴ .......................................... G06T 13/00
[52] U.S. Cl. .................................................. 364/200
[58] Field of Search ... 364/200 MS File, 900 MS File

[56] References Cited

U.S. PATENT DOCUMENTS 4,025,903  5/1977  Kaufman et al. .................. 364/200
4,026,555  5/1977  Kirschner et al. ................. 364/200
4,307,447  12/1981  Provanzano et al. ............. 364/200

Primary Examiner—David Y. Eng
Attorney, Agent, or Firm—Schwartz, Jeffery, Schwaab, Mack, Blumenthal & Evans

[57] ABSTRACT

A circuit for providing program assignable I/O addresses in a peripheral unit of a computer in which the initial I/O address is written into a register in the unit. The register receives the address information during the simultaneous presence of a memory write control signal and a particular address which is a duplicate of one which is in the ROM area of the computer's memory.

6 Claims, 1 Drawing Figure

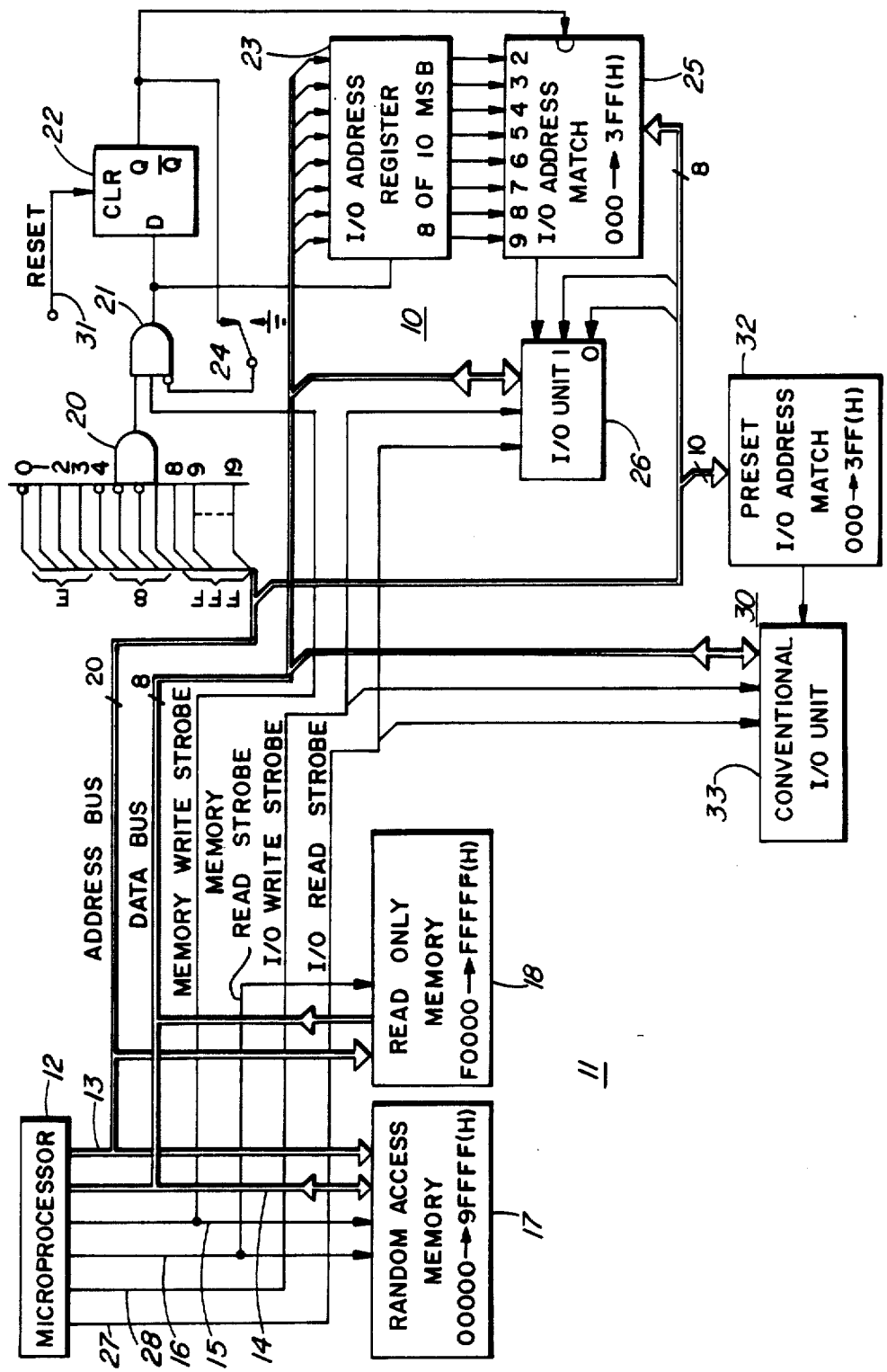

4,675,813

PROGRAM ASSIGNABLE I/O ADDRESSES FOR A COMPUTER

This invention relates to an arrangement for addressing a peripheral input/output (I/O) unit for a computer and more particularly to one in which the I/O addresses are program assignable.

BACKGROUND OF THE INVENTION

Many computers communicate with peripheral I/O units via preassigned I/O addresses. For instance, the International Business Machines' personal computer (IBM PC) has 1024 such I/O addresses ranging from hexadecimal 000 to 3FF, with 8 to 16 of these addresses being typically assigned to each peripheral unit. While 1024 I/O addresses are adequate to support any anticipated combination of I/O units which might be installed in a particular IBM PC, they are not adequate to allow each unit type being marketed to have one or more addresses assigned for its exclusive use. As a result, one or more I/O units installed in the same computer (particularly those from different manufacturers) could have overlapping I/O addresses.

One way of avoiding this conflict is to install switches in the I/O units so that the addresses are hardware programmable. The switches are then programmed so as to avoid any conflict between addresses of the peripheral units installed in a particular computer. In addition, when the hardware switches are programmed, the software in the computer must also be changed so that it will access the new hardware programmed addresses. It will be evident that such an arrangement is both costly to manufacture and time consuming to install because the computer must be disassembled. This disassembly and reassembly process could result in damage to the I/O unit or the computer whenever the switch positions are being altered.

SUMMARY OF THE INVENTION

It would therefore be desirable to have software programmable I/O addresses, to avoid the need for modifying the hardware. However, some arrangement must be found for initially assigning such addresses to the I/O peripheral unit during the normal operation of the computer. The present invention provides a unique solution to this problem by providing circuitry in the I/O unit for receiving data that defines the programmable I/O address or group of I/O addresses. This data however is written to a memory address which corresponds to one in the read only memory (ROM) of the main memory of the computer. The unique feature of this arrangement is that a write to this memory address will have no effect on the contents of the ROM. Hence, by having the I/O unit respond to a ROM address, a software assignable I/O address can be written to it without affecting the normal operation of the computer. In the IBM PC there are 65,536 such addresses (hexadecimal F0000 to FFFFF) assigned to the ROM in the basic system. Each of these addresses can be utilized to software assign an operating address to a different peripheral unit. This technique can be readily applied to any computer having a relatively large block of addresses assigned to the ROM.

Thus, in accordance with the present invention there is provided an input/output unit for a computer in which the computer comprises a random access memory (RAM) which responds to a first set of memory addresses, a read only memory (ROM) which responds to a non-overlapping second set of memory addresses, and a microprocessor for selectively addressing the read only memory to read data therefrom when applying a memory read control signal thereto, and for selectively addressing the random access memory to read data therefrom or write data thereto when applying respectively memory read or write control signals thereto. The I/O unit is characterized by a register for receiving data from the microprocessor in the presence of a memory write control signal and a particular address which is a duplicate of one in the ROM area of memory.

BRIEF DESCRIPTION OF THE DRAWING

An example embodiment of the invention will now be described with reference to the accompanying drawing which illustrates a peripheral input/output unit which is connected to a computer.

DESCRIPTION OF THE PREFERRED EMBODIMENT

In the following detailed description of the invention, reference is made to two sets of addresses. The first is an initiating address which is used to establish contact between the peripheral I/O unit and the computer after a power-up or reset. The second is a programmable I/O operating address which provides the communication link to the computer once established.

Referring to the single FIGURE, the peripheral I/O unit 10 of the invention is shown connected to a general purpose microcomputer 11, which for illustrative purposes has the same address or memory map as the IBM PC. A conventional known type of peripheral I/O unit 30 is also shown to illustrate the difference in structure between it and the unit 10. The computer 11 includes a microprocessor 12 which is coupled via a 20-bit address bus 13, an 8-bit data bus 14, a memory write strobe 15 and a memory read strobe 16 to a random access memory (RAM) 17 which has been assigned a first set of hexadecimal addresses 00000 to 3FFFF (basic system) or to 9FFFF (extended system). The address and data buses 13 and 14 and the read strobe 16 from the microprocessor 12 are also connected to a read only memory (ROM) which has been assigned a second non-overlapping set of hexadecimal addresses F0000 to FFFFF.

The peripheral unit 10 comprises an AND gate 20 having inverted and non-inverted inputs connected to the address bus 13 so as to respond to an initiating address hexadecimal FFF8E which is within the range of the second set of addresses assigned to the ROM 18. Under software program control, the microprocessor 12 concurrently transmits this address on the bus 13, and a memory write strobe on the lead 15. The simultaneous presence of these two signals produces an output from AND gate 21 which in turn sets a D-type flip-flop 22 and strobes an I/O address register 23 to store data being transmitted simultaneously on the bus 14. In the present embodiment, this data is the 8 of 10 most significant bits of the I/O operating address which ranges from hexadecimal 000 to 3FF. Thereafter, the AND gate 21 is disabled by the Q output of the D-type flip-flop 22 which is connected to the gate's inverted input via a switch 24. The register 23 is then latched with this address. This Q output also enables an I/O match detector 25 which has one input connected to the output of the I/O address register 23 and the other input to the address bus 13.

Thus when the system is initially powered up, the peripheral unit 10 does not respond to any I/O address until after data defining the 8 most significant bits of the 10-bit I/O address has been transmitted via the data bus 14 to the register 23. Thereafter, any transmission of this I/O address on the bus 13 will result in a match being detected in the address match detector 25 which generates a gating signal that in conjunction with control signals on either I/O read or write strobes 27 or 28, transfers data to or from an I/O unit 26 on the data bus 14. Since the entire address range for the IBM PC is from hexadecimal 00000 to FFFFF, while that of all the I/O units is from hexadecimal 000 to FFF, only the 10 least significant bits of the 20-bit binary address signal are required to uniquely define any one I/O address. The remaining address bits are "don't care" when an I/O address is being transmitted and the I/O control lines 27 or 28 are strobed. In this embodiment only 8 of these 10 bits (bits 2 to 9) are transmitted on the data line 14 to the register 23. The two least significant bits, 0 and 1 on the address bus 13 are not matched in the detector 25, but are coupled directly to the I/O unit 26. As a result, four separate I/O addresses can be used to control the flow of data to or from the I/O unit 26.

If the switch 24 is grounded so that the AND gate 21 cannot be disabled by the D-type flip-flop 22, an alternate address can be latched into the register 23 upon each occurrence of a write to the selected hexadecimal address FFF8E without affecting the ROM 18. Since the ROM memory range is from hex F0000 to FFFFF, 65,536 possible addresses can be set in the AND gate 20 to initiate contact with the I/O unit 26. Alternatively, the D-type flip-flop 22 can be reset by a signal on the lead 31 so that the next occurrence of the initiating address will result in the operating address of the unit 10 being reprogrammed.

The conventional peripheral I/O unit 30 includes a preset I/O address match detector 32 which enables an I/O unit 33 whenever there is a match between it and the incoming 10-bit I/O address on the bus 13. The I/O unit 33 then transmits or receives data on the bus 14 under control of the I/O read or write strobes 27 or 28 in a well known manner. However no alteration in this operating I/O address is possible since it is preset by the hardware in the unit 30.

In alternative applications, data can be written to the peripheral unit 10 at several different ROM addresses so that a complete 20-bit operating address can be transmitted over the 8-bit data bus 14. Alternatively, consecutive data can be written to the same ROM address in the peripheral unit 10. It will be evident however that no information can be read from the peripheral unit 10 at these ROM addresses since any attempt to do so would clash with information stored in the corresponding address of the ROM 18.

What is claimed is:

1. A peripheral input/output unit of a computer having a programmable input/output operating address stored within the unit, the computer comprising:

a random access memory which responds to a first set of addresses, a read only memory which responds to a non-overlapping second set of addresses, and a microprocessor for selectively addressing the read only memory to read data therefrom when applying a memory read control signal thereto, and for selectively addressing the random access memory to read data therefrom or write data thereto when applying respectively memory read or memory write control signals thereto;

the peripheral unit comprising:

means for detecting a selected one of the second set of addresses;

means for detecting the memory write control signal; and storage means responsive to the simultaneous detection of the selected one address and the memory write control signal by the detecting means, for receiving data transmitted from the microprocessor, wherein the data received by the storage means represents at least part of an input/output operating address of the unit.

2. A peripheral input/output unit as defined in claim 1, further including:

means for detecting a match between the data received by the storage means and a transmitted input/output address from the microprocessor;

means responsive to the detected match for reading data from or writing data to an input/output device of the peripheral unit when applying input/output read or write control signals respectively.

3. A peripheral input/output unit as defined in claim 1, wherein the at least part of the input/output operating address is eight of the ten most significant bits of the input/output operating address.

4. A peripheral input/output unit as defined in claim 1, wherein said means for detecting the selected one address comprises an AND gate having inverted and non-inverted inputs connected to said microprocessor via an address bus to detect the selected one address.

5. A peripheral input/output unit as defined in claim 1, further including means for the simultaneous detection of the selected one address and the memory write control signal.

6. A peripheral input/output unit as defined in claim 5, wherein said simultaneous detection means comprises a D-type flip-flop circuit connected to said microprocessor and said means for detecting the memory write control signal.

* * * * *